Sept. 16, 1969  D. J. NEWMAN  3,467,492
ELIMINATION OF NITROGEN OXIDES FROM GAS STREAMS
Filed Nov. 6, 1964
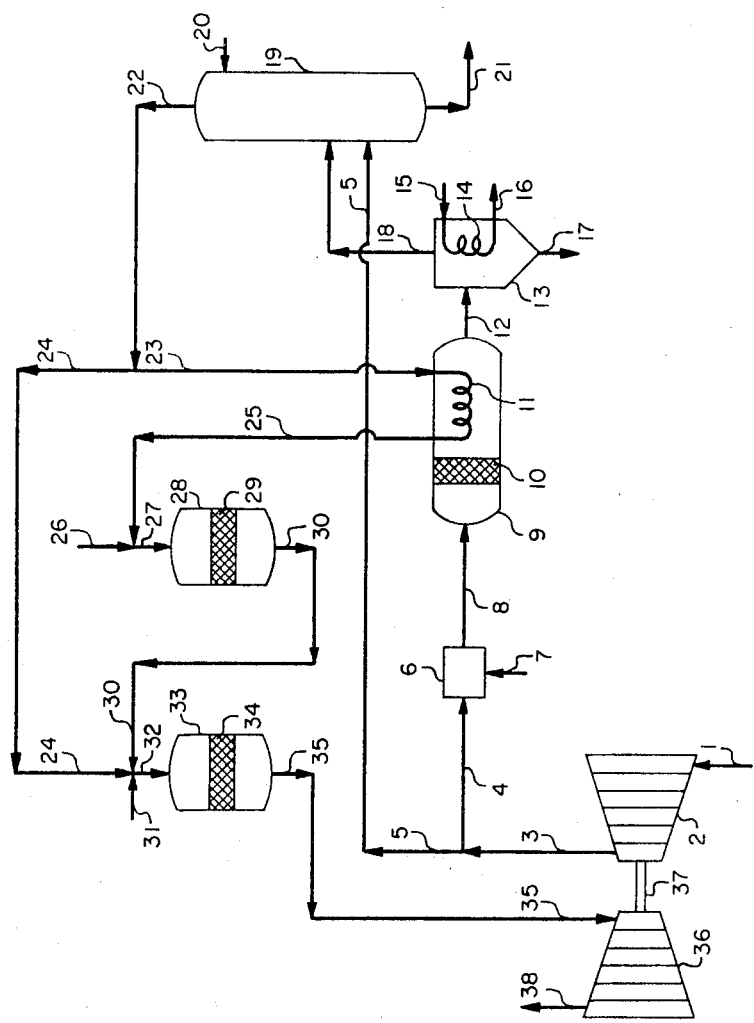
DANIEL J. NEWMAN
INVENTOR.
BY *J. P. Chaboty*
AGENT United States Patent Office 3,467,492
Patented Sept. 16, 1969

3,467,492
ELIMINATION OF NITROGEN OXIDES FROM GAS STREAMS
Daniel J. Newman, Jackson Heights, N.Y., assignor to Chemical Construction Corporation, New York, N.Y., a corporation of Delaware
Filed Nov. 6, 1964, Ser. No. 409,507
Int. Cl. B01d 49/00; C01b 21/26
U.S. Cl. 23—2                                    13 Claims

ABSTRACT OF THE DISCLOSURE

Nitrogen oxides are removed from waste gases such as the tail gases from nitric production by subjecting said gases to catalysis in a plurality of stages, a portion of the nitrogen oxides being removed in each stage. The gases are divided into a plurality of portions, the first portion thereof heated to the minimum ignition temperature of the catalyst bed, methane mixed therewith and the mixture subjected to catalysis. The treated gases are passed through the succeeding catalyst stages with a remaining portion of unheated gas and methane being added to the treated gas between each of the catalytic stages to control the temperature of the catalysis. The preheating of the first portion of the gas may be accomplished by indirect heat exchange with a hot gaseous stream produced by the catalytic air oxidation of ammonia.

The present invention relates to the elimination of nitrogen oxides from gas streams such as the tail gas from a nitric acid process. An improved catalytic procedure has been devised, which accomplishes the destruction of the nitrogen oxides by catalytic reaction in a plurality of catalytic stages. Temperature control is attained by by-passing a portion of the gas stream, which is subsequently added to the main reacted gas stream between catalytic stages and serves to quench-cool the gas stream, thus preven'ing catalyst overheating.

Various industrial processes such as the production of nitric acid and the nitration of organic compounds produce waste gas streams containing small proportions of nitrogen oxides, principally as nitric oxide and nitrogen dioxide. The concentrations of nitrogen oxides in such waste gas streams is too small to be economically recovered. Discharge of such waste gas streams into the atmosphere is highly objectionable, since the nitrogen oxides are corrosive and act as atmospheric pollutants. Thus, such waste gas streams must be treated in order to eliminate nitrogen oxides prior to discharge of the waste gas stream into the atmosphere. The usual approach is to catalytically react the waste gas stream containing nitrogen oxides with a reducing gas such as methane or hydrogen. Methane or natural gas principally consisting of methane is generally employed, due to economic considerations. The catalyst generally employed is a platinum group metal such as platinum, palladium, rhodium, ruthenium, osmium or iridium, or a mixture of such metals. The catalyst may be in the form of unsupported wire mesh, however the catalyst is generally supported on a suitable carrier such as alumina pellets, Nichrome wire or silica gel. The catalytic reaction of the nitrogen oxides with the reducing gas results in the elimination of the nitrogen oxides, with the formation of free nitrogen and water vapor and/or carbon dioxide. When free oxygen is also present in the waste gas stream, as in the case of a tail gas from a nitric acid process, the free oxygen preferentially reacts with the reducing gas before the nitrogen oxides, and must be eliminated before the destruction of the nitrogen oxides can take place. In any case, a final waste gas stream free of nitrogen oxides and suitable for discharge into the atmosphere is produced. The treated tail gas from a nitric acid process, when freed of nitrogen oxides, is also usable as a nitrogen source for ammonia synthesis.

The reactants must be heated to a minimum elevated temperature known as the "ignition" temperature, before the catalytic reaction will take place. In the case where methane is employed as the reducing gas, a minimum ignition temperature of about 900° F. must be provided, in order to attain catalytic reaction of the methane with the nitrogen oxides and oxygen. Since the reaction between methane and oxygen or nitrogen oxides is exothermic, it is apparent that the resulting waste gas stream is produced at a highly elevated temperature. Thus, the waste gas stream is generally passed through a waste heat boiler and/or a power recovery expander such as a gas turbine, after catalytic removal of nitrogen oxides, and is then discharged to the atmosphere.

The initial approach of reacting methane with the waste gas in one catalytic step, with an initial gas "ignition" temperature of about 900° F., yields a final gas operating temperature of 1500° F. to 1700° F. when the typical free oxygen content of 2.5% to 3.5% is present, and presents difficulties in design and operation. The reacted gas would normally be passed to a waste heat boiler immediately after catalytic reaction and cooled to a desired temperature. Since the desired temperature may be 900° F. or 1250° F. when the gas flows to a power recovery expander such as a gas turbine, control of the temperature may be quite difficult, involving operation of a control valve at 1500° F. to 1700° F. In addition, the platinum metal catalysts which are best suited for reduction of the nitrogen oxides are usually not recommended for operation at these higher temperatures, since exposure of the catalysts to excessive temperatures is detrimental in that a loss of catalyst activity rapidly takes place.

A second approach to the problem, as described in U.S. Patent No. 2,970,034, involves the use of two catalyst charges or beds with intermediate cooling. The waste gas at 900° F. is reacted with less than the stoichiometric quantity of fuel such as methane. This serves to raise the gas stream temperature to a moderately higher temperature of about 1250° F. The gas stream is cooled back to 900° F. in a heat exchanger or boiler and then reacted with additional fuel in a second catalytic combustor or catalyst bed to eliminate all oxygen and nitrogen oxides. Operation of this system involves the provision of the intermediate exchanger or boiler, which is an extra item of equipment, as well as ancillary control devices.

In the present invention, nitrogen oxides are eliminated from a waste gas stream by a sequence which involves the provision of at least two catalyst beds. The waste gas stream is divided into at least two portions. A first portion is heated to about 900° F. and mixed with a proportion of methane which is less than the stoichiometric requirement for complete reaction with the oxygen and nitrogen oxides contained in the first gas portion. The gas mixture is then passed through the first catalyst bed, and catalytic reaction takes place resulting in the elevation of the gas stream temperature to an intermediate level, typically in the range of 1000° F. to 1400° F. Due to the fact that less than the stoichiometric requirement of methane for complete reaction is provided, the highly elevated temperature level attained in prior art sequences is not reached, and thus the catalyst bed is not subjected to overheating and concomitant deterioration with loss of catalyst activity. The reacted gas mixture from the first catalyst bed is then quench-cooled to a lower final temperature above about 900° F. by the addition of a second portion of cold waste gas and methane.

The resulting gas mixture is now passed through a second catalyst bed, wherein further catalytic reaction takes place, with temperature elevation and at least partial reaction of nitrogen oxides and oxygen. In a preferred case wherein only two catalyst beds are provided, sufficient methane is added to the gas stream between the beds to react with all of the nitrogen oxides and oxygen, and a final reacted gas stream free of nitrogen oxides is produced from the second catalyst bed. In other cases, a large proportion of free oxygen may be present in the original waste gas stream, and in this case three or more catalyst beds may be provided to obtain a more gradual reduction of the oxygen content of the gas stream, with interbed addition of cold gas portions and methane before each succeeding bed. In any case, a final reacted gas stream free of nitrogen oxides is produced at a moderate temperature level, and may be directly passed to a gas turbine or other power recovery expander, when the gas stream is at elevated pressure.

Several advantages of this procedure as compared to the prior art sequences may be mentioned. Savings in investment compared to the prior two-bed process with intermediate cooling mentioned supra result from elimination of the intermediate exchanger or waste heat boiler, and reduction in the size of the heater required to preheat the waste gas to 900° F. In addition, improvement in operation results from the fact that the control valves regulating the flow of waste gas and intermediate gas mixtures operate at low temperature. Finally, the process of the present invention is clearly advantageous compared to the prior art sequence in which the entire waste gas stream-methane mixture is passed through a single catalyst bed, since overheating of the catalyst bed with concomitant reduction in catalyst activity is prevented.

It is an object of the present invention to provide an improved process for the elimination of nitrogen oxides from waste gas streams.

Another object is to provide an improved catalytic process for the elimination of nitrogen oxides from waste gas streams by reduction with methane.

A further object is to provide an improved catalytic process for the elimination of nitrogen oxides from waste gas streams in which overheating of the catalyst is prevented.

An additional object is to provide an improved multistage catalytic process for the elimination of nitrogen oxides from a waste gas stream, in which only a portion of the total nitrogen oxides content is eliminated in each stage.

Still another object is to provide an improved process for the elimination of nitrogen oxides from the tail gas generated in a nitric acid process.

These and other objects and advantages of the present invention will become evident from the description which follows. Referring to the figure, a preferred embodiment of the invention is illustrated in a flow diagram of the process as applied to the tail gas from a nitric acid process. The process may be carried out at substantially atmospheric pressure, however, the production of nitric acid by ammonia oxidation and absorption of nitrogen oxides is preferably carried out at an elevated pressure, typically in the range of 30 p.s.i.g. to 200 p.s.i.g. Thus, process air stream 1 is compressed in compressor 2 to an elevated pressure preferably in the range of 30 p.s.i.g. to 200 p.s.i.g., and is discharged as compressed process air stream 3. Stream 3 is divided into the main combustion air stream 4 and bleach air stream 5. The combustion air stream 4 is passed into mixer vessel 6, together with superheated ammonia vapor stream 7. The gaseous streams are mixed in unit 6, and the resulting gas mixture 8 is passed into ammonia burner unit 9, which is provided with catalyst 10 consisting usually of platinum mesh. The exothermic catalytic oxidation of the ammonia vapor thus takes place at elevated temperature, with the formation of nitrogen oxides in the gas stream. The process gas stream is preferably partially cooled in unit 9 by heat exchange with a portion of the tail gas passing through coil 11, which is disposed in heat exchange relationship to the process gas stream in unit 9. The gas stream now leaves unit 9 via 12, and passes into nitric gas cooler-condenser 13, which is provided with cooling coil 14. Cooling water is admitted into coil 14 via 15 and warmed water is discharged via 16. The cooling of the gas stream results in concomitant condensation of weak nitric acid solution, which is withdrawn from unit 13 as liquid stream 17.

The cooled gas stream now leaves unit 13 via 18, and passes into a conventional nitrogen oxides absorption tower 19. The gas stream rises in tower 19, countercurrent to absorption water stream 20 admitted near the top of the tower. Thus, the nitrogen oxides are absorbed into an aqueous liquid phase which passes downward in the tower and contacts bleach air stream 5 admitted near the bottom of the tower. Air stream 5 serves to convert all of the absorbed nitrogen oxides to nitric acid, and a product stream consisting of strong nitric acid is withdrawn via 21.

A tail gas stream 22 is withdrawn from the top of tower 19, usually at a temperature below 200° F., and typically contains up to about 1% unabsorbed nitrogen oxides and up to about 5% free oxygen by volume. The balance of stream 22 consists mostly of nitrogen, together with a small proportion of water vapor. In accordance with the novel process sequence of the present invention, tail gas stream 22 is now divided into a first portion stream 23 and a second portion stream 24. Stream 23 will preferably consist of about 50% to 80% of the total tail gas stream 22. Stream 23 is passed through heat exchanger coil 11, and is heated by heat exchange with the hot ammonia combustion gas stream to a temperature of at least about 900° F. The resulting hot tail gas portion stream 25 is withdrawn from coil 11, and is combined with methane stream 26 to form a first combined gas stream 27. Methane stream 26 is added to stream 25 in a proportion such that stream 27 will contain less than the stoichiometric proportion of methane for complete reaction with the contained oxygen and nitrogen oxides.

Combined gas stream 27 is now passed into catalyst vessel 28 and in contact with catalyst bed 29, which may consist of one or a mixture of the platinum group metals enumerated supra, either in a metallic form such as a wire mesh or else supported on a suitable carrier such as alumina pellets, Nichrome wire or silica gel. The platinum group metal will preferably consist of platinum or palladium, due to greater catalytic activity and economic considerations. As a result of the elevated temperature contact of the combined gas stream 27 with catalyst bed 29, exothermic catalytic reaction takes place between the methane and a portion of the oxygen and nitrogen oxides. The resulting reacted gas stream 30 is thus withdrawn from vessel 28 at a temperature above that of stream 27, and typically in the range of 1000° F. to 1400° F. However, due to the fact that the methane content of stream 27 is less than the stoichiometric proportion for reaction with all of the contained oxygen and nitrogen oxides, stream 30 is not produced at the highly elevated prior art temperatures of 1500° F. to 1700° F., and thus overheating of catalyst bed 29 is prevented.

The first reacted gas mixture 30 is now quench-cooled to a lower final temperature above about 900° F. by the addition of the second cold tail gas portion, stream 24, and methane stream 31. Stream 31 is added in a proportion such that the resulting gas mixture stream 32 will contain at least the stoichiometric quantity of methane to react with all of the contained nitrogen oxides and oxygen. Stream 32 is now passed into catalyst vessel 33, which contains catalyst bed 34. Bed 34 is similar in configuration and function to bed 29 described supra. As a result of the elevated temperature contact of the combined gas stream 32 with catalyst bed 34, exothermic catalytic reaction takes place between the methane and substantially all of the contained nitrogen oxides and oxygen. The resulting reacted gas stream 35 is thus withdrawn from vessel 33 at a temperature above that of stream 32, typically in the range of 1000° F. to 1400° F., and is substantially free of nitrogen oxides.

Stream 35 may now be directly and safely discharged into the atmosphere, after suitable recovery of heat and/or power. Stream 35 may be directly passed through a waste heat boiler, not shown, and then discharged through a stack. However, stream 35 in this preferred embodiment is at an elevated pressure, typically in the range of 30 p.s.i.g. to 200 p.s.i.g. Thus, stream 35 is preferably expanded to a lower pressure through power producing means before discharge, to gain useful power. This expansion of stream 35 may serve to provide the requisite power for compression of air stream 1. Thus, stream 35 is now preferably expanded to a lower pressure through gas turbine 36, which is connected by shaft 37 to air compressor 2 and serves to drive unit 2. The resulting expanded gas stream 38 is discharged from unit 36 at a reduced temperature and pressure and may be passed through a waste heat boiler or other heat exchanger before discharge to the atmosphere. Alternatively, since stream 38 consists principally of nitrogen, stream 38 after cooling may be utilized as a nitrogen source in ammonia synthesis.

Numerous alternatives within the scope of the present invention will occur to those skilled in the art. Thus, the process operating ranges of temperature, pressure, etc., discussed supra constitute only preferred conditions for optimum results, and the invention may also be practiced outside of these ranges in suitable instances, depending on individual operating circumstances in a particular case.

An important alternative embodiment of the present invention involves the provision of 3 or more stages of catalytic conversion, with the waste gas stream being divided into a number of portions equal to the number of catalyst stages. This modification is of particular value when the waste gas stream contains a relatively large proportion of oxygen, since in this case the first stage heat release in a two-stage sequence would be too great and overheating of the catalyst might take place. When 3 or more stages of catalytic conversion are provided, the first portion of waste gas is heated to at least about 900° F., combined with methane as described supra, and passed through the first catalytic stage. Succeeding portions of waste gas plus methane are added to the main reacted gas stream between stages, with the proportion of methane added before the final catalyst stage being at least sufficient to react with all of the oxygen and nitrogen oxides contained in the combined gas stream. Thus, when three or more catalyst stages are provided, a more gradual elimination of the total nitrogen oxides content of the waste gas stream is attained, and the amount of waste gas which is heated and passed to the first catalyst bed is a smaller proportion of the total waste gas stream.

Although the process of the present invention has been described supra as applied to the tail gas from a nitric acid process, it will be appreciated that the process is equally applicable to other waste gas streams containing small proportions of nitrogen oxides, such as the off-gas streams generated from organic nitrations. In addition, although methane per se has been specified supra as the reducing gas employed for the catalytic elimination of the nitrogen oxides and oxygen, it will be apparent that in practice natural gas containing a major proportion of methane may be provided as the reducing gas.

In some cases it will be desirable to heat the second tail gas portion, stream 24, to an intermediate temperature below 900° F., such as 200° F. This heating may suitably take place by heat exchange with hot process streams within the system, such as bleach air stream 5. Other suitable heat exchange sequences between process streams may be carried out in practice, to attain optimum results. Thus, the absorption tower will be suitably cooled in practice by the provision of internal cooling coils, not shown, containing cooling water. It will also be apparent that additional cooling coils containing boiler feed water will be suitably disposed in ammonia combustor 9, for heat exchange with the hot combustion gas stream and concomitant steam generation.

Another alternative embodiment of the present invention could consist of carrying out the catalytic oxidation of ammonia with air in unit 9 at substantially atmospheric pressure. In this case, if it is desired to conduct the subsequent absorption of nitrogen oxides and formation of nitric acid at elevated pressure, compressor 2 could be disposed so as to compress stream 12 or stream 18, while still being driven by gas turbine 36.

An example of an industrial application of the process of the present invention will now be described.

Example

The tail gas from a standard nitric acid facility was generated at 200° F. and contained 2.6% oxygen and 0.3% nitrogen oxides by volume. The available reducing gas was natural gas containing 94.36% methane and having a lower heating value of 942.6 B.t.u. per standard cubic foot. The desired final gas temperature was 1250° F. About 67% of the total tail gas was heated to 900° F. and mixed with natural gas. The mixture was passed to the primary catalytic combustor, with natural gas flow controlled to maintain a discharge temperature of 1250° F., with an oxygen content of 1% in the reacted gas stream recovered as an effluent from the primary combustor. The remaining 33% of the tail gas at 200° F. was mixed with the primary combustor effluent to yield a mixed gas temperature of 900° F. and an oxygen content of about 1.5%. Sufficient natural gas was added to react with all remaining oxygen and nitrogen oxides and the total gas mixture was passed to the secondary combustor. The final fully reacted gas produced from the secondary combustor was at a temperature of 1250° F., and was substantially free of nitrogen oxides.

I claim:
1. A process for the elimination of oxides of nitrogen from a gas stream containing oxides of nitrogen and oxygen which comprises dividing said gas stream into a plurality of portions, heating a first portion of said gas stream to an elevated temperature of at least the minimum ignition temperature of a platinum group metal catalyst bed, adding methane to said first gas stream portion to form a combined gas mixture, catalytically reacting said combined gas mixture in a first catalyst bed comprising a platinum group metal, whereby the oxygen and nitrogen oxides contents of said combined gas mixture are reduced by exothermic reaction with methane and a reacted gas mixture is formed at an increased temperature above the inlet temperature of said combined gas mixture, and adding the other unheated portions of said gas stream and methane to said reacted gas mixture between succeeding stages of catalytic reaction in succeeding catalyst beds, said succeeding catalyst beds comprising a platinum group metal deposited on a suitable carrier, whereby said reacted gas mixture is cooled to a lower temperature of at least the minimum ignition temperature of said succeeding catalyst beds before each succeeding catalyst bed and the oxygen and nitrogen oxides content of said other portions of said gas stream are reduced by exothermic reaction with methane in the succeeding stages of catalytic reaction, to produce a final reacted gas mixture substantially free of nitrogen oxides.

2. A process for the elimination of oxides of nitrogen from a gas stream containing oxides of nitrogen and oxygen which comprises dividing said gas stream into a plurality of portions, heating a first portion of said gas stream to an elevated temperature of at least the minimum ignition temperature of a platinum group metal catalyst bed, adding methane to said first gas stream portion to form a combined gas mixture, passing said combined gas mixture through a plurality of catalyst beds comprising a platinum group metal, whereby the oxygen and nitrogen oxides contents of said combined gas mixture are reduced by exothermic reaction with methane in the first of said catalyst beds, and adding a succeeding unheated portion of said gas stream and methane to the reacted combined gas mixture between each of said catalyst beds, whereby the gas mixture is cooled to a lower temperature of at least the minimum ignition temperature of each succeeding catalyst bed before each succeeding catalyst bed and the oxygen and nitrogen oxides contents of the succeeding portions of said gas stream are reduced by exothermic reaction with methane in the succeeding catalyst beds, to produce a final reacted gas mixture substantially free of nitrogen oxides.

3. A process for the elimination of oxides of nitrogen from a gas stream containing oxides of nitrogen and oxygen which comprises dividing said gas stream into two portions, heating a first portion of said gas stream to an elevated temperature of at least the minimum ignition temperature of a platinum group metal catalyst bed, adding methane to said heated first gas stream portion to form a first combined gas mixture, catalytically reacting said first combined gas mixture in a first catalyst bed comprising a platinum group metal, whereby the oxygen and nitrogen oxides contents of said first combined gas mixture are reduced by exothermic reaction with methane and a first reacted gas mixture is formed at an increased temperature above the inlet temperature of said first combined gas mixture, adding the second unheated portion of said gas stream and methane to said first reacted gas mixture whereby said gas mixture is cooled to a final temperature of at least the minimum ignition temperature of a platinum group metal catalyst bed and a second combined gas mixture is formed, and catalytically reacting said second combined gas mixture in a second catalyst bed comprising a platinum group metal deposited on a suitable carrier, whereby the nitrogen oxides content of said second combined gas mixture is eliminated by exothermic reaction with methane and a final reacted gas mixture is formed.

4. The process of claim 3, in which said gas stream containing nitrogen oxides and oxygen is the tail gas from a nitric acid process.

5. The process of claim 3, in which said first reacted gas mixture is formed at a temperature in the range of 1000° F. to 1400° F.

6. The process of claim 3, in which said first portion of said gas stream consists of about 50% to 80% of the total gas stream.

7. The process of claim 3, in which said platinum group metal comprises platinum deposited on a suitable carrier.

8. The process of claim 3, in which said platinum group metal comprises palladium deposited on a suitable carrier.

9. In a nitric acid process wherein ammonia is catalytically oxidized with air to produce a hot gas stream containing nitrogen, nitrogen oxides, oxygen and water vapor, said hot gas stream is cooled, the cooled gas stream is contacted with liquid water and air whereby the major portion of said nitrogen oxides are absorbed into said liquid water and product nitric acid is produced, together with a tail gas stream principally containing residual unabsorbed nitrogen oxides, oxygen and nitrogen, and said tail gas stream is processed to eliminate nitrogen oxides and thereby produce a final tail gas stream principally containing nitrogen and suitable for discharge to atmosphere, the improved process for eliminating nitrogen oxides from said tail gas which comprises dividing said tail gas stream into a first portion and a second portion, said first portion consisting of about 50% to 80% of the total tail gas stream, heating said first tail gas portion to an elevated temperature of at least the minimum ignition temperature of a platinum group metal catalyst bed, adding methane to said heated first gas portion to form a first combined gas mixture, catalytically reacting said first combined gas mixture in a first catalyst bed comprising a metal selected from the group consisting of platinum and palladium, said metal being deposited on a suitable carrier, whereby the oxygen and nitrogen oxides contents of said first combined gas mixture are reduced by exothermic reaction with methane and a first reacted gas mixture is formed at a temperature in the range of 1000° F. to 1400° F., adding the second unheated portion of said tail gas stream and methane to said first reacted gas mixture whereby said gas mixture is cooled to a final temperature of at least the minimum ignition temperature of a platinum group metal catalyst bed and a second combined gas mixture is formed, and catalytically reacting said second combined gas mixture in a second catalyst bed comprising a metal selected from the group consisting of platinum and palladium, said metal being deposited on a suitable carrier, whereby the nitrogen oxides content of said second combined gas mixture is eliminated by exothermic reaction with methane and a final reacted gas mixture comprising tail gas substantially free of nitrogen oxides is formed at a temperature in the range of 1000° F. to 1400° F.

10. In a nitric acid process wherein ammonia is catalytically oxidized with air at elevated pressure to produce a hot gas stream containing nitrogen, nitrogen oxides, oxygen and water vapor, said hot gas stream is cooled, the cooled gas stream is contacted with liquid water and air whereby the major portion of said nitrogen oxides are absorbed into said liquid water and product nitric acid is produced, a tail gas stream principally containing residual unabsorbed nitrogen oxides, oxygen and nitrogen is discharged from said absorption step, and said tail gas stream is expanded to reduced pressure through power producing means, the improved process for eliminating nitrogen oxides from said tail gas which comprises dividing said tail gas stream into a first portion and a second portion prior to said expansion step, said first portion consisting of about 50% to 80% of the total tail gas stream, heating said first tail gas portion to an elevated temperature of at least the minimum ignition temperature of a platinum group metal catalyst bed by heat exchange with said hot gas stream produced by the catalytic oxidation of ammonia with air, adding methane to said heated first gas portion to form a first combined gas mixture, catalytically reacting said first combined gas mixture in a first catalyst bed comprising a metal selected from the group consisting of platinum and palladium, said metal being deposited on a suitable carrier, whereby the oxygen and nitrogen oxides contents of said first combined gas mixture are reduced by exothermic reaction with methane and a first reacted gas mixture is formed at a temperature in the range of 1000° F. to 1400° F., adding the second unheated portion of said tail gas stream and methane to said first reacted gas mixture whereby said gas mixture is cooled to a final temperature of at least the minimum ignition temperature of a platinum group metal catalyst bed and a second combined gas mixture is formed, catalytically reacting said second combined gas mixture in a second catalyst bed comprising a metal selected from the group consisting of platinum and palladium, said metal being deposited on a suitable carrier, whereby the nitrogen oxides content of said second combined gas mixture is eliminated by exothermic reaction with methane and a final reacted gas mixture comprising tail gas substantially free of nitrogen oxides is formed at a temperature in the range of 1000° F. to 1400° F., and expanding said final reacted gas mixture through power producing means to a reduced pressure.

11. The process of claim 10, in which said catalytic oxidation of ammonia with air takes place at a pressure in the range of 30 p.s.i.g. to 200 p.s.i.g.

12. The process of claim 10, in which said power producing means consists of a gas turbine, said gas turbine being connected with an air compression means which produces compressed air for said catalytic oxidation of ammonia.

13. In a nitric acid process wherein ammonia is catalytically oxidized with air to produce a hot gas stream containing nitrogen, nitrogen oxides, oxygen and water vapor, said hot gas stream is cooled, the cooled gas stream is contacted with liquid water and air whereby the major portion of said nitrogen oxides are absorbed into said liquid water and product nitric acid is produced together with a tail gas stream principally containing residual unabsorbed nitrogen oxides, oxygen and nitrogen, and said tail gas stream is processed to eliminate nitrogen oxides and thereby produce a final tail gas stream principally containing nitrogen and suitable for discharge to atmosphere, the improved process for eliminating nitrogen oxides from said tail gas which comprises dividing said tail gas stream into a first portion and a second portion, said first portion consisting of about 50% to 80% of the total tail gas stream, heating said first tail gas portion to an elevated temperature of at least the minimum ignition temperature of a platinum group metal catalyst bed by heat exchange with said hot gas stream produced by the catalytic oxidation of ammonia with air, adding methane to said heated first gas portion to form a first combined gas mixture, catalytically reacting said first combined gas mixture in a first catalyst bed comprising a metal selected from the group consisting of platinum and palladium, said metal being deposited on a suitable carrier, whereby the oxygen and nitrogen oxides contents of said first combined gas mixture are reduced by exothermic reaction with methane and a first reacted gas mixture is formed at a temperature in the range of 1000° F. to 1400° F., adding the second unheated portion of said tail gas stream and methane to said first reacted gas mixture whereby said gas mixture is cooled to a final temperature of at least the minimum ignition temperature of a platinum group metal catalyst bed and a second combined gas mixture is formed, and catalytically reacting said second combined gas mixture in a second catalyst bed comprising a metal selected from the group consisting of platinum and palladium, said metal being deposited on a suitable carrier, whereby the nitrogen oxides content of said second combined gas mixture is eliminated by exothermic reaction with methane and a final reacted gas mixture comprising tail gas substantially free of nitrogen oxides is formed at a temperature in the range of 1000° F. to 1400° F.

References Cited

UNITED STATES PATENTS 2,970,034    1/1961    Anderson et al. _____ 23—2
3,136,602    6/1964    Berger _____ 23—162

OSCAR R. VERTIZ, Primary Examiner

E. C. THOMAS, Assistant Examiner

U.S. Cl. X.R.

23—159; 162